(12) United States Patent
Yuan et al.

(10) Patent No.: US 8,060,687 B2
(45) Date of Patent: Nov. 15, 2011

(54) FLASH MEMORY ALLOCATING METHOD

(75) Inventors: Kuo-Hua Yuan, Kaohsiung (TW); Ho-Chieh Chuang, Changhua County (TW); Chao-Nan Chen, Taipei (TW)

(73) Assignee: JMicron Technology Corp., Science-Based Industrial Park, Hsin-Chu (TW)

( * ) Notice: Subject to any disclaimer, the term of this patent is extended or adjusted under 35 U.S.C. 154(b) by 640 days.

(21) Appl. No.: 12/208,338

(22) Filed: Sep. 11, 2008

(65) Prior Publication Data

US 2010/0030945 A1    Feb. 4, 2010

(30) Foreign Application Priority Data

Aug. 1, 2008   (TW) .............................. 97129289 A

(51) Int. Cl.
*G06F 12/00* (2006.01)
(52) U.S. Cl. .................. 711/103; 711/156; 365/185.09; 365/185.33
(58) Field of Classification Search .................. 711/103, 711/156; 365/185.09, 185.33
See application file for complete search history.

(56) References Cited

U.S. PATENT DOCUMENTS

| | | | | |
|---|---|---|---|---|
| 7,460,383 B2* | 12/2008 | Fukuda et al. | ............... | 365/49.1 |
| 7,900,118 B2* | 3/2011 | Chang et al. | .................. | 714/763 |
| 2008/0065815 A1* | 3/2008 | Nasu et al. | .................... | 711/103 |
| 2009/0158124 A1* | 6/2009 | Kawai et al. | .................. | 714/763 |

FOREIGN PATENT DOCUMENTS

CN        1567252 A       1/2005

* cited by examiner

*Primary Examiner* — Stephen Elmore
(74) *Attorney, Agent, or Firm* — Winston Hsu; Scott Margo

(57) ABSTRACT

An allocating method for a flash memory is disclosed. The allocating method includes the following steps: adjusting a preliminary data storage capacity corresponding to the flash memory for determining a real data storage capacity of the flash memory; adjusting a preliminary spare area capacity corresponding to the flash memory for determining a real spare area capacity of the flash memory, wherein a total capacity of the preliminary data storage capacity and the preliminary spare area capacity is equal to the total capacity of the real data storage capacity and the real spare area capacity; and allocating the real data storage capacity and the real spare area capacity to the flash memory, wherein the real data storage capacity stores data, and the real spare area capacity stores parity codes generated by an error codes correction algorithm performed upon the stored data in the real data storage capacity.

6 Claims, 4 Drawing Sheets

FLASH MEMORY ALLOCATING METHOD

BACKGROUND OF THE INVENTION

1. Field of the Invention

The present invention relates to a flash memory allocating method, and more particularly, to an allocating method for prolonging the lifetime of a NAND flash memory.

2. Description of the Prior Art

The non-volatile NAND flash memory is one of the most popular storage devices in the field of portable electronic devices or embedded electronic systems. For example, a personal digital assistant (PDA), a digital camera, an MP3 walkman, and a recorder device are all installed with a NAND flash memory. The greater the number of times the NAND flash memory is accessed, the more inaccurate the data stored in the NAND flash memory will be. The conventional way to solve the above-mentioned problem is to utilize an error codes correction (ECC) configuration in the NAND flash memory to recover the error data. For example, in the conventional NAND flash memory having a page size of 2 K bits, there is always a spare area of 64 bytes for storing the parity code generated by a specific ECC algorithm when the specific ECC algorithm performs an ECC calculation upon the data of the page, and in the conventional NAND flash memory having a page size of 4 K bits, there is always a spare area of 218 bytes for storing the parity code generated by the specific ECC algorithm when the specific ECC algorithm performs the ECC calculation upon the data of the page.

Please refer to FIG. 1. FIG. 1 is a diagram illustrating an allocating method of a spare area in each page of a conventional NAND flash memory, wherein the specific ECC algorithm utilizes a Reed-Solomon ECC algorithm and a Bose, Chaudhuri and Hocquengham (BCH) ECC algorithm. When a BCH 8 ECC algorithm encodes the data in the NAND flash memory, the parity code generated in the encoding process may occupy 13 bytes of the spare area in each page. When a Reed-Solomon 6 ECC algorithm encodes the data in the NAND flash memory, the parity code generated in the encoding process may occupy 15 bytes of the spare area in each page. When a Reed-Solomon 8 ECC algorithm encodes the data in the NAND flash memory, the parity code generated in the encoding process may occupy 20 bytes of the spare area in each page. When a Reed-Solomon 10 or a BCH 15 ECC algorithm encodes the data in the NAND flash memory, the parity code generated in the encoding process may occupy 25 bytes of the spare area in each page. When the conventional NAND flash memory is encoded/decoded by the Reed-Solomon ECC algorithm or the BCH ECC algorithm, 512 bytes of data storage capacity is allocated in each page. Therefore, when the conventional NAND flash memory is encoded/decoded by the Reed-Solomon ECC algorithm or the BCH ECC algorithm, the ability to correct the error data in the NAND flash memory is limited by the size of the spare area in each page. In other words, the reason that the Reed-Solomon ECC algorithm and the BCH ECC algorithm cannot provide a much better error correcting ability upon the NAND flash memory is due to the predetermined size of the spare area in each page, which is an inconvenient restriction for a user who requires frequent access of the NAND flash memory.

SUMMARY OF THE INVENTION

Therefore, one of the objectives of the present invention provides an allocating method for prolonging the lifetime of a NAND flash memory.

According to an embodiment of the present invention, an allocating method for a flash memory is disclosed. The allocating method comprises the following steps: adjusting a preliminary data storage capacity corresponding to the flash memory for determining a real data storage capacity of the flash memory; adjusting a preliminary spare area capacity corresponding to the flash memory for determining a real spare area capacity of the flash memory, wherein a total capacity of the preliminary data storage capacity and the preliminary spare area capacity is equal to the total capacity of the real data storage capacity and the real spare area capacity; and allocating the real data storage capacity and the real spare area capacity to the flash memory, wherein the real data storage capacity stores data, and the real spare area capacity stores parity codes generated by an error codes correction algorithm performed upon the stored data in the real data storage capacity.

According to another embodiment of the present invention, an allocating method for a flash memory is disclosed. The allocating method comprises the following steps: determining a real data storage capacity and a real spare area capacity, wherein the real spare area capacity is larger than a predetermined byte number that corresponds to the error codes correction algorithm; and allocating the real data storage capacity and the real spare area capacity to the flash memory, wherein the real data storage capacity stores data, and the real spare area capacity stores parity codes generated by the error codes correction algorithm performed upon the stored data in the real data storage capacity.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
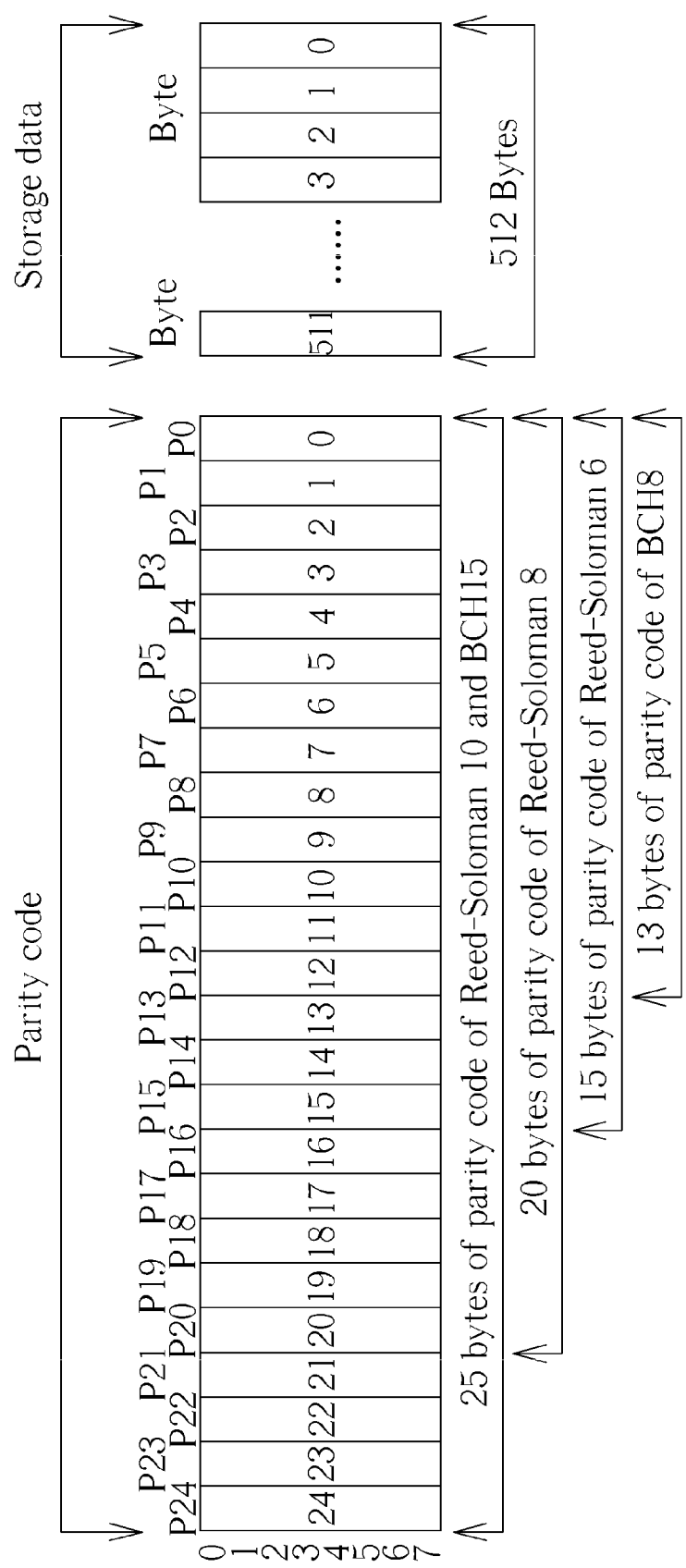
FIG. 1 is a diagram of an allocating method of a spare area in each page in a conventional NAND flash memory.
Figure 2:
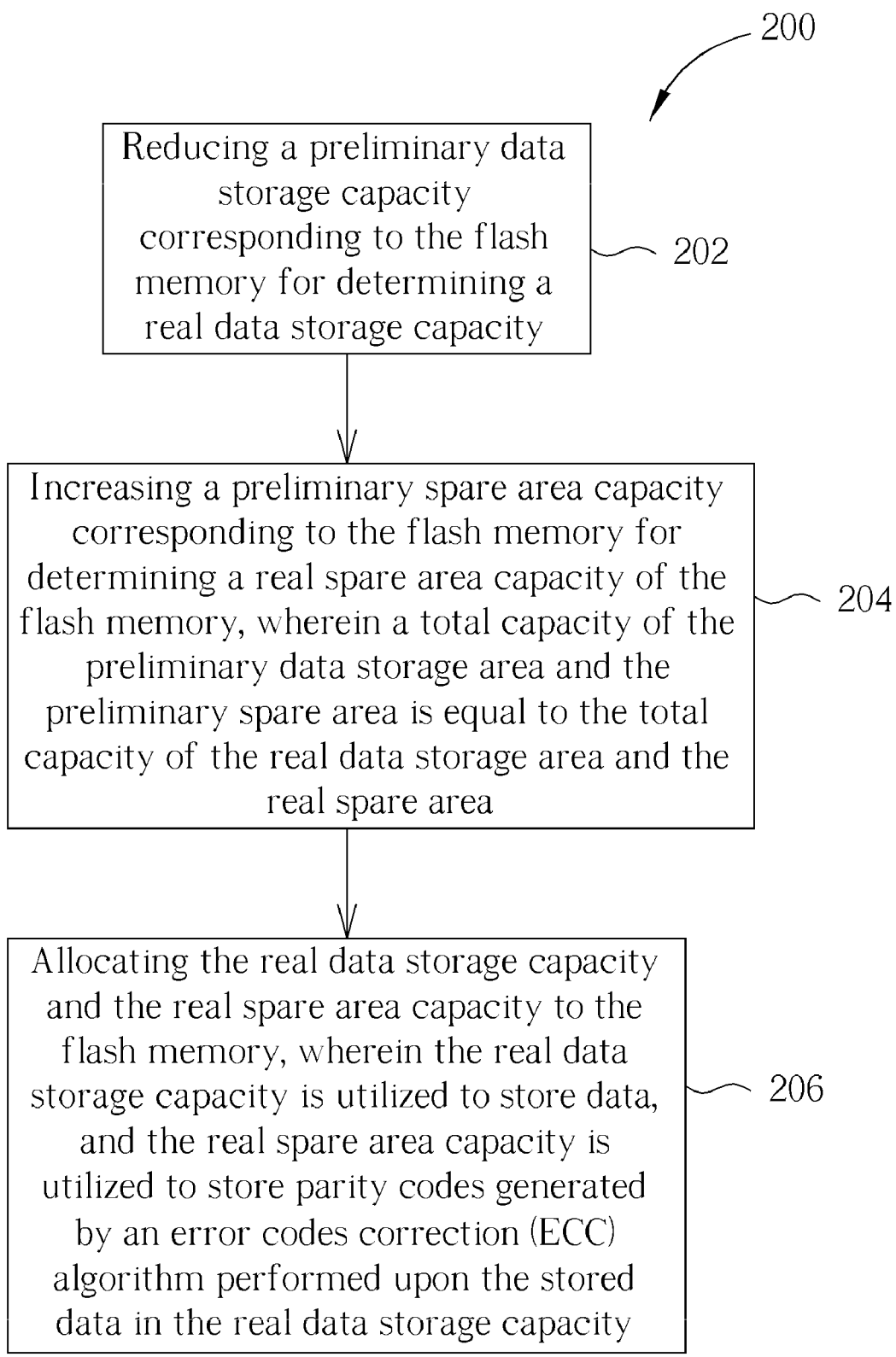
FIG. 2 is a flowchart of an allocating method for a flash memory according to an embodiment of the present invention.
Figure 3:
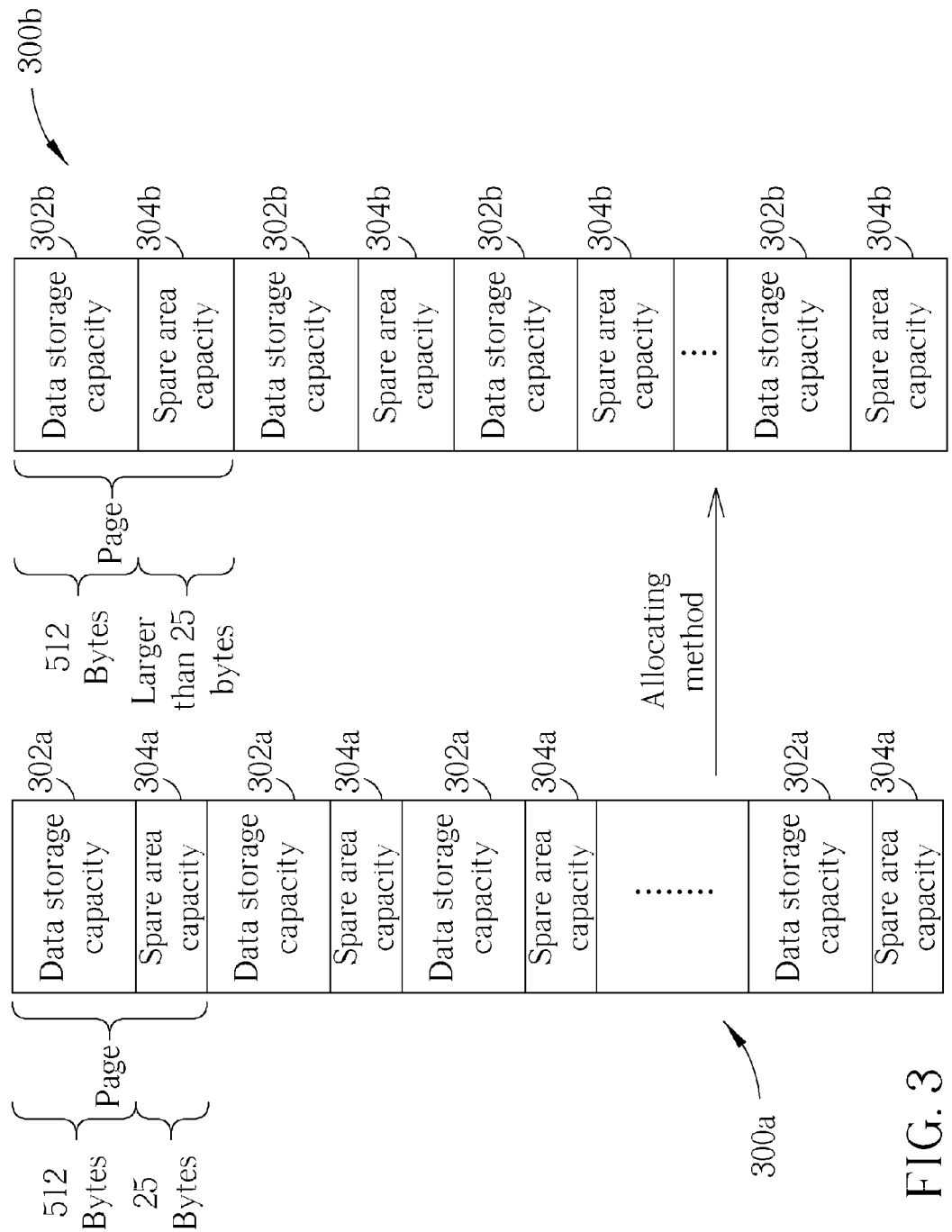
FIG. 3 is a diagram of a pre-allocated flash memory before allocation is performed by the allocating method and a post-allocated flash memory after allocation is performed by the allocating method.

Please refer to FIG. 2 in conjunction with FIG. 3. FIG. 2 is a flowchart illustrating an allocating method 200 for a flash memory according to an embodiment of the present invention. FIG. 3 is a diagram illustrating a pre-allocated flash memory 300a before allocation is performed by the allocating method 200 and a post-allocated flash memory 300b after allocation is performed by the allocating method 200. Please note that, in order to describe the spirit of the present invention more clearly, the flash memory is described by using a NAND flash memory, but this is not a limitation of the present invention. In other words, those skilled in this art will understand that any storage devices having flash characteristics, such as a NOR flash memory, also belong within the scope of the present invention. Provided that substantially the same result is achieved, the steps of the flowchart shown in FIG. 2 need not be in the exact order shown and need not be contiguous, that is, other steps can be intermediate. The allocating method 200 comprises the following steps:

Step 202: reducing a preliminary data storage capacity corresponding to the flash memory for determining a real data storage capacity;

Step 204: increasing a preliminary spare area capacity corresponding to the flash memory for determining a real spare area capacity of the flash memory, wherein a total capacity of the preliminary data storage area and the preliminary spare area is equal to the total capacity of the real data storage area and the real spare area; and Step 206: allocating the real data storage capacity and the real spare area capacity to the flash memory, wherein the real data storage capacity is utilized to store data, and the real spare area capacity is utilized to store parity codes generated by an error codes correction (ECC) algorithm performed upon the stored data in the real data storage capacity.

Since the smallest communicating unit that exchanges data between the flash memory and a main memory is a page of the flash memory, the flash memory in FIG. 3 is illustrated in page units. Before the capacity of the flash memory is allocated by the allocating method 200 of the present invention, the sizes of a data storage capacity 302a and a spare area capacity 304a in each page are predetermined values with respect to a specific ECC algorithm. For example, when a Reed-Solomon 10 ECC algorithm or a Bose, Chaudhuri and Hocquenghem (BCH) 15 ECC algorithm performs an error codes correction calculation upon the 512 bytes data stored in the data storage capacity 302a of each page, the parity codes generated after the calculation may occupy the spare area capacity 304 having the predetermined capacity of 25 bytes. However, when the capacity of the spare area capacity 304 is preset as 25 bytes, the ability to decode the data in each page of the flash memory by using the specific ECC algorithm is limited by the predetermined capacity. Similarly, the accessing time of the flash memory is also limited by the predetermined capacity. Therefore, to the specific ECC algorithm, when performing the capacity allocation upon the flash memory in the step 202 of the allocating method 200, a preliminary data storage capacity of the flash memory is first estimated, and the preliminary data storage capacity is the total data storage capacity of the flash memory, as shown in FIG. 3. In other words, the preliminary data storage capacity is the total capacity of all data storage capacity 302a of each page in the flash memory. Then, the allocating method 200 reduces the preliminary data storage capacity corresponding to the flash memory, and determines a real data storage capacity, in which the real data storage capacity is smaller than the preliminary data storage capacity. Please note that the data storage capacities 302a and 302b in each page are set to be 512 bytes, however, this is not a limitation of the present invention.

Then, in the step 204, the allocating method 200 increases the preliminary spare area capacity of the flash memory to determine a real spare area capacity in order to improve the error data correcting ability of the specific ECC algorithm performed upon each page, wherein a total capacity of the preliminary data storage capacity and the preliminary spare area capacity is equal to the total capacity of the real data storage capacity and the real spare area capacity. In the step 206, the real data storage capacity and the real spare area capacity are allocated to the flash memory, wherein the real data storage capacity is utilized to store data, and the real spare area capacity is utilized to store parity codes generated by the specific ECC algorithm performed upon the stored data in the real data storage capacity. Please refer to FIG. 3 again; after the flash memory has a capacity allocated by the allocating method 200, since the data storage capacity 302b of each page is kept unchanged at 512 bytes, and the spare area capacity 304b of each page is larger than 25 bytes, the ability to correct the error data in each page by the specific ECC algorithm can be improved, and therefore the number of accesses of the flash memory can be increased. Please note that the data storage capacity 302b and the spare area capacity 304b are allocated in an interlaced manner in the post-allocated flash memory 300b, however this allocation is not a limitation of the present invention. In other words, each data storage capacity 302b and its corresponding spare area capacity 304b are not necessarily adjacent, which means that the allocation of the data storage capacity 302b and the spare area capacity 304b can be randomly arranged according to the design requirements. For example, in another embodiment of the present invention, a plurality of data storage capacities 302b are allocated successively, and the corresponding spare area capacities 304b are then allocated successively after the plurality of data storage capacities 302b.

Figure 4:
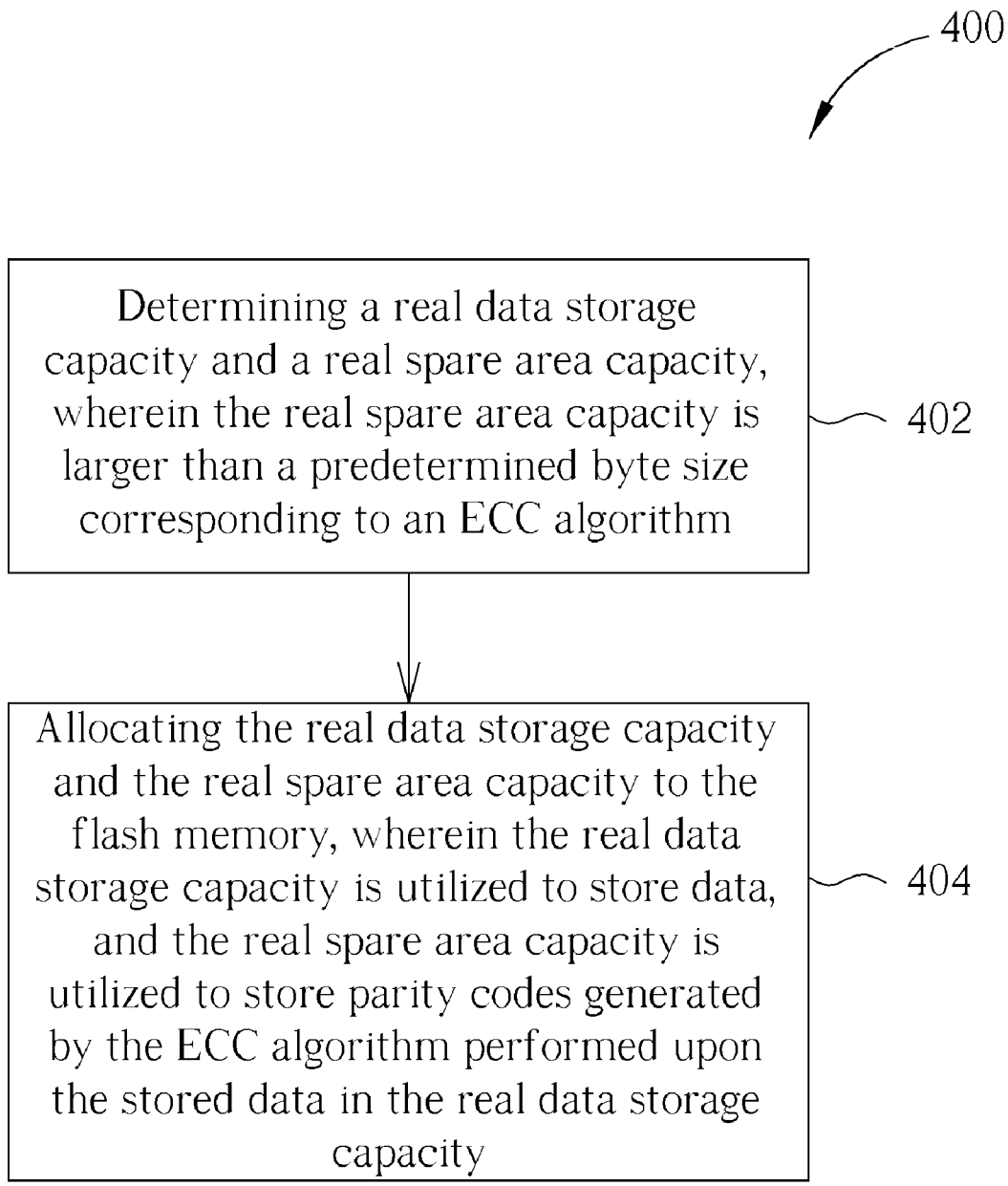
FIG. 4 is a flowchart of the allocating method for a flash memory according to a second embodiment of the present invention.

Please refer to FIG. 4. FIG. 4 is a flowchart illustrating an allocating method 400 for a flash memory according to a second embodiment of the present invention. Similarly, in order to describe the spirit of the present invention more clearly, the flash memory is described by using the NAND flash memory, but this is not a limitation of the present invention. In other words, those skilled in this art will readily understand that any storage devices having flash characteristics, such as a NOR flash memory, also belong within the scope of the present invention. Provided that substantially the same result is achieved, the steps of the flowchart shown in FIG. 4 need not be in the exact order shown and need not be contiguous, that is, other steps can be intermediate. The allocating method 400 comprises the following steps:

Step 402: determining a real data storage capacity and a real spare area capacity, wherein the real spare area capacity is larger than a predetermined byte size corresponding to an ECC algorithm; and Step 404: allocating the real data storage capacity and the real spare area capacity to the flash memory, wherein the real data storage capacity is utilized to store data, and the real spare area capacity is utilized to store parity codes generated by the ECC algorithm performed upon the stored data in the real data storage capacity.

Similar to the embodiment shown in FIG. 2, when the Reed-Solomon 10 ECC algorithm or a Bose, Chaudhuri and Hocquenghem (BCH) 15 ECC algorithm performs an error codes correction calculation upon the 512 bytes data stored in the data storage capacity of each page, the parity codes generated after the calculation may occupy the spare area capacity having the predetermined capacity of 25 bytes. However, the step 402 of the allocating method 400 determines the real data storage capacity and the real spare area capacity for each page of the flash memory, wherein the real spare area capacity is larger than 25 bytes, and the real data storage capacity is 512 bytes. In step 404, the allocating method 400 allocates the real data storage capacity and the real spare area capacity for each page of the flash memory, wherein the real data storage capacity is utilized to store data, and the real spare area capacity is utilized to store parity codes generated by the ECC algorithm performed upon the stored data in the real data storage capacity. In addition, since the real data storage capacity of each page is kept unchanged at 512 bytes after the allocating method 400 is performed on the flash memory, and the real spare area capacity 304*b* of each page is larger than 25 bytes, the ability to correct the error data in each page by the ECC algorithm can be improved, and the number of accesses of the flash memory is consequently increased.

According to the above-mentioned disclosure, the first embodiment and the second embodiment are interpreted through the Reed-Solomon 10 ECC algorithm and the BCH 15 ECC algorithm, however these are not limitations of the present invention. In other words, when the specific ECC algorithm is a BCH 8 ECC algorithm, the disclosed embodiments are able to allocate the spare area capacity being larger than 13 bytes in each page, which also belongs within the scope of the present invention; when the specific ECC algorithm is a Reed-Solomon 6 ECC algorithm, the disclosed embodiments are able to allocate the spare area capacity being larger than 15 bytes in each page, which also belongs within the scope of the present invention; and when the specific ECC algorithm is a Reed-Solomon 8 ECC algorithm, the disclosed embodiments are able to allocate the spare area capacity being larger than 20 bytes in each page, which also belongs within the scope of the present invention. More specifically, for a flash memory, if the specific ECC algorithm is the BCH 8 ECC algorithm, then the flash memory can use a higher level ECC algorithm, such as the Reed-Solomon 10 and BCH 15 ECC algorithms, to perform the error data calculation after the flash memory is processed by the disclosed embodiments.

Those skilled in the art will readily observe that numerous modifications and alterations of the device and method may be made while retaining the teachings of the invention.

What is claimed is:

1. An allocating method for a flash memory, comprising:
    adjusting a preliminary data storage capacity corresponding to the flash memory for determining a real data storage capacity of the flash memory;
    increasing a preliminary spare area capacity corresponding to the flash memory to determine a real spare area capacity of the flash memory, wherein a total capacity of the preliminary data storage capacity and the preliminary spare area capacity is equal to the total capacity of the real data storage capacity and the real spare area capacity;
    allocating the real data storage capacity and the real spare area capacity to the flash memory; and
    storing data into the real data storage capacity, and storing parity codes generated by an error codes correction algorithm performed upon the stored data into the real data storage capacity.

2. The allocating method of claim 1, wherein the real data storage capacity is smaller than the preliminary data storage capacity, and the real spare area capacity is larger than the preliminary spare area capacity.

3. The allocating method of claim 1, wherein the real spare area capacity is larger than a predetermined byte number that corresponds to the error codes correction algorithm.

4. The allocating method of claim 1, wherein the flash memory is a NAND flash memory.

5. An allocating method for a flash memory, comprising:
    determining a real data storage capacity and a real spare area capacity, wherein the real spare area capacity is larger than a predetermined byte number that corresponds to the error codes correction algorithm;
    allocating the real data storage capacity and the real spare area capacity to the flash memory, wherein the real data storage capacity stores data, and the real storage capacity; and
    storing data into the real data storage capacity, and storing parity codes generated by the error codes correction algorithm performed upon the stored data into the real data storage capacity.

6. The allocating method of claim 5, wherein the flash memory is a NAND flash memory.

* * * * *